April 30, 1929.   M. J. FOWLER ET AL   1,711,379

AIR BRAKE

Filed Dec. 10, 1926

INVENTORS
Mack J. Fowler
Mark Harmon &
Lonnie H. Blankenship

WITNESS
John Milton Jester

By Ernest P. Mechlin
their ATTORNEY.

Patented Apr. 30, 1929.

1,711,379

UNITED STATES PATENT OFFICE.

MACK J. FOWLER, MARK HARMON, AND LONNIE H. BLANKENSHIP, OF ROANOKE, VIRGINIA, ASSIGNORS OF ONE-FOURTH TO JOHN R. BAGBY, OF ROANOKE, VIRGINIA.

AIR BRAKE.

Application filed December 10, 1926. Serial No. 153,842.

The invention relates to air brake systems for railroad trains.

The principal object of the invention, generally stated, is to provide means in an air brake system for automatically retaining any desired pressure in the brake cylinder regardless of defective packing or difference in piston travel, all of the brake cylinders in the system being consequently maintained under even pressure resulting in uniform condition and operation.

An important object of the invention is to provide an air operated retaining valve connected with the triple valve and with an auxiliary train pipe for maintaining a constant pressure within the brake cylinder without interfering with the action of the usual triple valve, the primary regulating means or operating means for the retaining valve being under the direct control of the engineer.

A further object of the invention is to provide a retaining valve for an air brake system so constructed as to permit the passage of fluid pressure into the brake cylinder at all times so as to replace any loss of pressure therein resulting from defective packing, leaky joints, or the like, the valve being of such construction as to open automatically and permit the escape of any excess pressure which might develop in the brake cylinder, uniformity in the pressure being thus obtained.

Another object of the invention is to provide a system of this character in which the degree of pressure applied to the retaining valve for holding it closed and through it for maintaining an even pressure in the brake cylinder is readily controllable by the engineer.

A still further object of the invention is the provision of an air brake system embodying a retaining valve structure and arrangement of this character which will operate to maintain even wheel temperature as when descending grades with the brakes applied, this condition resulting from the uniformity of pressure in all of the brake cylinders as a consequence of the employment of the retaining valve arrangement.

An additional object is to provide a system or apparatus of this character which will be simple and inexpensive to manufacture, easy to install, positive in action, efficient and durable in service, and a general improvement in the art.

With the above and other objects and advantages in view, the invention preferably consists in the construction, arrangement and combination of parts to be hereinafter more fully described and claimed, and illustrated in the accompanying drawing in which:

Figure 4 is a section through a modified form of valve.

Figure 1:
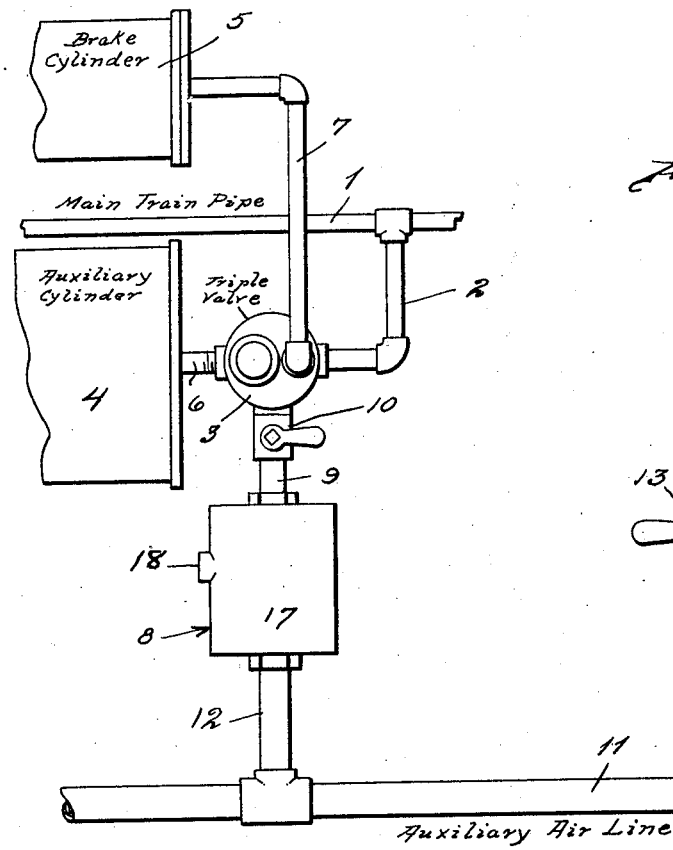
Figure 1 is a general view of brake apparatus embodying the invention.

Referring more particularly to the drawings, the numeral 1 designates the main train pipe with which connects a branch pipe 2 leading to the triple valve 3. The auxiliary cylinder and brake cylinder are designated, respectively, by the numerals 4 and 5 and have connected therewith pipes 6 and 7 which lead to the triple valve 3. The retaining valve forming the principal part of the subject matter of this application is designated as a whole by the numeral 8 and is connected with the triple valve at the exhaust port thereof by means of a pipe 9 within which may be interposed a cutout valve 10 of ordinary construction. The numeral 11 designates the auxiliary train pipe with which is connected a branch pipe 12 in turn connected with the triple valve 8. The auxiliary pipe 11 extends to the locomotive cab and has interposed therein an operating valve 13 having an exhaust port 14 and a reducing valve 15. A suitable pressure gauge 16 is connected with the auxiliary pipe 11 at a point beyond the operating valve 13 for indicating the air pressure within the auxiliary pipe 11, retaining valve and brake cylinder, as will be hereinafter explained. The auxiliary train pipe 11 of course leads from a suitable source of supply of air pressure though such is not illustrated.

Figure 2:
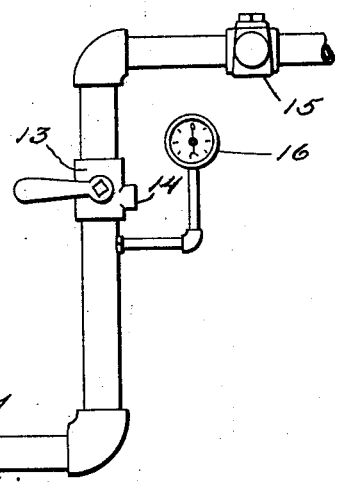
Figure 2 is a longitudinal section through the retaining valve showing it in normal or closed position.
Figure 2:
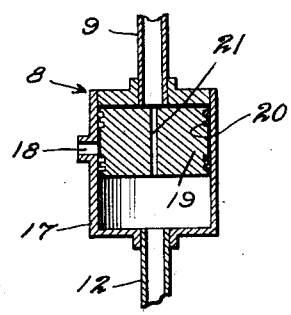
Figure 3:
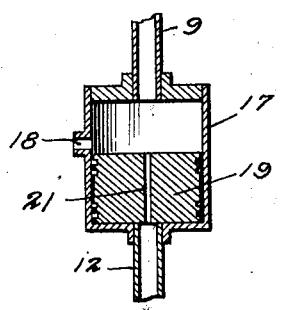
Figure 3 is a similar view showing it in open or release position.

A very important feature of the invention is the specific construction of the retaining valve 8. In the preferred form of the invention disclosed in Figures 2 and 3, this valve is represented as comprising a casing 17 with the ends of which communicate the pipes 9 and 12 above referred to. At one side this casing is provided with an exhaust port 18 through which air from the brake cylinder may exhaust as is well known. Mounted for reciprocation within the casing 17 is a piston 19 having any ordinary or preferred packing rings 20 or the like as is the usual practice. However, instead of being solid, the piston 19 is formed with a relatively small passage 21 extending entirely therethrough and acting to maintain constant communication between the auxiliary air line 11 and the brake cylinder 5 so that air pressure may enter the cylinder at all times and maintain the proper degree therein notwithstanding any leakage which may exist on account of defective packing or from other causes.

In the operation, it will be apparent that the operating valve 13 may be opened to the desired extent to permit the maintenance of suitable pressure within the auxiliary air line 11, the degree of pressure being indicated on the gauge 16. Under normal conditions the valve 8 is in closed position, the piston 19 then seating against and closing the end of the pipe 9, being maintained thus by the air pressure behind it entering the casing from the auxiliary air line 11 through the branch pipe 12. As stated above, compressed air may always pass through the passage 21 for maintaining a constant pressure within the brake cylinder. In case the pressure within the brake cylinder should build up and become excessive it would overbalance the pressure behind the piston 19, resulting in movement of this piston toward the other end of the casing or into the position shown in Figure 3, the port 18 being then at least partially uncovered so that the excess pressure may escape to the atmosphere. This action is automatic. Whenever the operating valve 13 is closed, the pressure within the auxiliary air line 11 will escape through the exhaust port 14 and the pressure within the brake cylinder will cause the piston 19 to move into the position disclosed in Figure 3 so that the pressure within the brake cylinder may be relieved.

Instead of having the passage 21 formed through the piston 19, use may be made of the structure disclosed in the modified form of the invention illustrated in Figure 4 wherein the casing 22 corresponding to the casing 17 is formed in its wall with a passage 23 communicating with the pipes which connect with the triple valve and the auxiliary air line, the piston 24, corresponding to the piston 19 being solid. Obviously, the modified form of retaining valve would operate in identically the same manner as the first described form.

Clearly when this system is installed, it will be seen that all of the brake cylinders may be maintained at the same pressure throughout the train. This pressure may be varied at the will of the engineer to meet whatever conditions may exist. As a consequence of this important feature it is apparent that wheel temperatures may be maintained uniform to overcome the great objection which is present in ordinary or every day systems in which certain of the wheels on a train become greatly overheated when the brakes are applied while others change their temperature hardly at all. The mere overcoming of this disadvantage is of wonderful importance inasmuch as wear will be equalized. From the foregoing description and a study of the drawings it is really believed the construction, operation and advantages will be readily apparent to one skilled in the art without further explanation.

While we have shown and described preferred embodiments of the invention, it should be understood that the disclosure is merely an exemplification of the principles involved and that the right is reserved to make all such changes in the detailed construction and in the arrangement and combination of parts as will not depart from the spirit of the invention or the scope of the claims hereunto appended.

Having thus described the invention, we claim:

1. In an air brake system including a brake cylinder, an auxiliary cylinder, a main train pipe, a triple valve connected with all of the same, an auxiliary air line having a reducing valve therein, a retaining valve interposed between and connected with the triple valve and the auxiliary air line, said retaining valve having an exhaust port and embodying a movable element for covering and uncovering said port, and said valve having a passage providing constant communication between the auxiliary air line and triple valve.

2. In an air brake system including a brake cylinder, an auxiliary cylinder, a main train pipe, a triple valve connected with all of the same, an auxiliary air line having a reducing valve therein, a retaining valve interposed between and connected with the triple valve and the auxiliary air line, said retaining valve having an exhaust port and embodying a movable element for covering and uncovering said port, said valve having a passage providing constant communication between the auxiliary air line and triple valve, and a manually operable control valve interposed in said auxiliary air line for regulating the pressure applied to the retaining valve.

3. A retaining valve for an air brake system comprising a casing having compressed air conducting pipes connected and communicating therewith and having an exhaust port at an intermediate point, a piston movable longitudinally within the casing, and means permitting constant limited communication through the valve.

4. In an air brake system including brake and auxiliary cylinders, a triple valve and a main train pipe, the combination of an auxiliary air line having pressure control means, and means interposed between the auxiliary air line and the triple valve for constantly applying pressure to the brake cylinder, said means being responsive to the operation of the pressure control means in the air line and to air pressure in the brake cylinder.

5. In an air brake system, the combination of a brake cylinder, a main train line, an auxiliary air line, and means interposed between the auxiliary air line and the cylinder for maintaining a predetermined pressure in the latter independently of the pressure in the main train line, said means being operable to permit exhaust of pressure from the brake cylinder when the pressure therein exceeds that in said auxiliary air line.

6. In an air brake system, a brake cylinder, a main train line, means for controlling flow of fluid pressure to the brake cylinder from the main train line, and means for maintaining a predetermined pressure in the brake cylinder comprising an auxiliary air line having control means, and a pressure operated valve interposed between the auxiliary air line and the brake cylinder for permitting flow of fluid pressure to the latter, said valve having means responsive to the building up of excessive fluid pressure in the brake cylinder to permit escape thereof.

7. In an air brake system including a brake cylinder, a triple valve and a main train line, means for maintaining a constant predetermined pressure within the brake cylinder comprising an auxiliary air line having control means, and a valve interposed between the auxiliary air line and the triple valve for supplying a continual limited fluid pressure flow to the brake cylinder through the triple valve and embodying means for permitting reduction of pressure within the brake cylinder when said pressure exceeds that in the auxiliary air line.

8. In an air brake system including a brake cylinder, a main train line and a control valve, the combination of an auxiliary air line, and a retaining valve interposed between the auxiliary air line and the main control valve for supplying continuous fluid pressure to the cylinder for maintaining a constant predetermined pressure therein, said valve having outlet means and embodying a movable member controlling the outlet responsive to increase or decrease of pressure at either side.

In testimony whereof we affix our signatures.

MACK J. FOWLER.
MARK HARMON.
LONNIE H. BLANKENSHIP.